United States Patent [19]

Cha et al.

[11] 4,138,687

[45] Feb. 6, 1979

[54] APPARATUS FOR PRODUCING MULTIPLE UNIFORM FLUID FILAMENTS AND DROPS

[75] Inventors: Charles L. Cha, Xenia; Shou L. Hou, Centerville, both of Ohio

[73] Assignee: The Mead Corporation, Dayton, Ohio

[21] Appl. No.: 816,609

[22] Filed: Jul. 18, 1977

[51] Int. Cl.² .................... G01D 15/18

[52] U.S. Cl. .................... 346/75

[58] Field of Search .................... 346/75, 140 R

[56] References Cited

U.S. PATENT DOCUMENTS 4,007,465 2/1977 Chaudhary .................... 346/140 R

OTHER PUBLICATIONS

Krause, K. A., Focusing Ink Jet Head, IBM Technical Disclosure Bulletin, Sep. 1973, vol. 16, No. 4, p. 1168.

*Primary Examiner*—George H. Miller, Jr.
*Attorney, Agent, or Firm*—Biebel, French & Nauman

[57] ABSTRACT

Method and apparatus for use in an ink jet printing device to synchronously produce a plurality of uniform fluid filaments and droplets. A fluid reservoir is provided with an orifice plate having a plurality of orifices through which the fluid issues to produce the desired droplets. Above the liquid contained in the reservoir is a rigid piston suspended above the reservoir in contact with the liquid and having means sealingly engaging between the piston and the sides of the reservoir. The piston is moved translationally up and down by a plurality of electro-acoustical transducers which are secured to the piston in contact with its upper surface so as to produce pressure fluctuations in the fluid uniformly and synchronously over the plurality of orifices.

10 Claims, 4 Drawing Figures

APPARATUS FOR PRODUCING MULTIPLE UNIFORM FLUID FILAMENTS AND DROPS

BACKGROUND OF THE INVENTION

Field of the Invention

The present invention relates to fluid droplet generation, and more particularly, to the generation of a plurality of uniform fluid filaments and droplets for use in printing apparatus such as ink jet printing devices and the like.

PRIOR ART

Uniform fluid filaments and synchronous droplet generation is particularly useful in multiple ink jet printing apparatus of the type disclosed, for example, in Lyon U.S. Pat. No. 3,739,393, although the present invention is an entirely different approach of the actual drop stimulation portion of this device. Generally, in such devices there are one or more rows of orifices which receive an electrically conductive recording fluid, such as for instance a water base ink, from a pressurized fluid supply reservoir and eject the fluid in rows of parallel streams or filaments which are stimulated to produce uniform size droplets at a uniform distance from the orifices.

As the droplets are formed they are selectively charged by application of charging voltages to charging electrodes positioned adjacent the filaments at the point where they break up into drops. Droplets which are so charged are deflected by an electrical field into an appropriately positioned catcher. Drops which are not so charged pass through the electrical field without being deflected and are deposited on a web which is transported at relatively high speed across the droplet paths.

Printing information is transferred to the droplets through charging. In order to print at the highest possible resolution, charging control voltages should be applied to the charging electrodes at the same frequency as that at which the drops are being generated. This permits each depositing drop to define a resolution cell distinct from that of all other drops. In addition, printing information cannot be transferred to the drops properly unless each charging electrode is activated in phase with drop formation at the associated filament. Failure to do this results in partially charged drops, which miss the catcher and deposit at erratic positions on the web.

It is therefore apparent that jet drop printers of the above described type cannot be operated at their maximum capability unless the drops in all streams are generated in synchronism with their associated data transfer charging pulses. This in turn implies either a measurement of drop generation timing for each and every filament or control of drop generation in such a way that the timing or phase of drop generation is predetermined.

The ideal solution from a simplicity point of view is to apply drop stimulating disturbances to all filaments at a common amplitude and in exact synchronism. Then if the jets all have the same diameter, velocity and rheological characteristics, all filaments will have the same length and will generate drops in synchronism. Such synchronized drop generation greatly facilitates the desired data phase locking, because a timing measurement for one jet is a timing measurement for all.

In addition to achieving maximum printing quality it is important to achieve maximum printing width. In order to achieve the latter it is essential that there is minimum energy fluctuation throughout the jet array. This energy uniformity is reflected as filament length uniformity within the array. Excessive energy fluctuation (filament length variation) will cause either the generation of satellite droplets or nonlinear behavior of the jet; both of which are unacceptable conditions for printing.

In the above mentioned Lyon et al patent drop generation is accomplished by a traveling wave technique. This method is limited in both maximum printing width and printing quality. As taught by Lyon et al a series of traveling waves propagate along the length of the orifice plate, stimulating the jets as they go. However, energy attenuation accompanies the wave propagation and thus causes a steady lengthening of the jet filament along the array. Eventually the filament variation becomes excessive and the maximum usable printing width is reached.

In this system the different jets do not generate drops simultaneously, but there is a known phase relation between them. The system can in theory operate at a better resolution provided that each data channel be provided with a phase shifting network for phase shifting the switching control signals by an amount matching the known jet-to-jet drop generation phase shift. This requires a great deal of electronics and is difficult to achieve in practice due to unpredictable variation of plate wavelength (and hence phase errors) caused by non-uniform orifice plate boundries. Even if such synchronization is achieved, the best printing quality is still not available due to the fact that traveling wave stimulation generates a skewed droplet matrix and droplets in a row non-horizontal do not print simultaneously. There is a linear time delay along the row of droplets. A time difference of one period is observed for every full wavelength of flexural wave along the longitudinal axis of the orifice plate. Past technology used multiple droplets to print a single dot to minimize the criticality of phase shift. However, this is at the expense of printing speed and printing quality. It also explains the reason why printing quality goes up when the printing speed is reduced.

Attempts have been made to overcome both limitations of traveling wave stimulation by vibrating the liquid in the reservoir and keeping the orifice plate rigid. This involves the use of a transducer or a plurality of transducers coupled to the orifices through the liquid so that the uniform filament and synchronous drop generation is created by generation of waves within the printing liquid itself. Such prior art devices have been ineffective in accomplishing their intended results mainly because they have not been able to prevent interference by reflected waves, etc., with the main waves being generated. This substantially reduces the uniformity of the drop generation so as to make such systems impractical.

SUMMARY OF THE INVENTION

The present invention overcomes the above described difficulties and disadvantages associated with prior art devices by providing a plane wave stimulation device which is not limited in the length of the jet array which can be uniformly and synchronously stimulated.

This is accomplished by the provision of a piston member supported on the manifold above the array of orifices in such a manner that the piston is substantially vibrationally isolated from the manifold forming the reservoir. The piston is driven by a plurality of electroacoustical transducers secured in spaced relation along the length of the top surface of the piston out of contact with the liquid in the reservoir. The piston is supported by the plurality of transducer assemblies which are in turn secured to the manifold in such a manner as to minimize the transfer of vibration directly from the transducers to the manifold which would otherwise cause interference with the stimulation of the liquid in the reservoir. The entire apparatus is designed to minimize any such interfering wave stimulation that might otherwise occur if the transducer and piston member were not vibrationally isolated from the manifold forming the reservoir, as well as the orifice plate.

In the case of piezoelectric transducers, which are the preferred form of the transducers for use in the present invention, a pair of multiples thereof, or identically shaped transducers are used in each transducer assembly with one superposed above the other and with a mounting plate, which also preferably acts as an electrode for the transducers, sandwiched between the two transducers. It is well known that transducers possess polarity and therefore, in the transducer assemblies the individual transducers are preferably so positioned that their facing surfaces in contact with opposite sides of the mounting plate are of like potential and the outer surfaces of each transducer are also of like potential, but opposite from the adjacent surfaces.

The use of two identically shaped piezoelectric transducers positioned in this manner, has three advantages. First, the position of like potential surfaces as mentioned above permits the transducers to be grounded so that someone touching the transducers or manifold will not be shocked. Second, and more important so far as functioning of the apparatus is concerned, the transducers will apply equal and opposite forces to the mounting plate which in essence results in the plate being secured at a nodal point of the transducer which minimizes the possibility of transfer of vibration through the mounting plate to the manifold. To further minimize stray vibrations the mounting plate is sandwiched between resilient members which are also electric insulators for isolating the manifold from high voltage. Third, the efficiency of the transducer is doubled by the transducer pair.

As mentioned above, the piston member is resiliently surrounded in the manifold by, for example, an O-ring which extends around the entire peripheral side portions of the piston member and seals between the piston member and the manifold to prevent leakage of fluid from the reservoir.

The piston member can actually be comprised of a relatively rigid plate of generally rectangular cross section; however, the preferred configuration has a right trapezoidal cross sectional lower portion which forms an energy concentrator that extends into the reservoir to a position adjacent the orifices in the orifice plate.

In order to minimize the production of flexural waves longitudinally in the piston member so that it is truly rigid, transducers are spaced along the upper surface of the piston member substantially less than half the flexural wave length in the piston member at the maximum operating frequency.

To further discourage the generation of such waves, a plurality of transverse horizontally spaced, vertical cuts can optionally be made through the piston member with adjacent cuts extending from opposite sides, i.e., at the top and the bottom, to a point past the midsection of the piston member so that there is no horizontal plane through the piston member which is not intercepted by at least some of the cuts. These cuts act as a barrier to wave propogation within the piston member and limit the interfering wave motion longitudinally of the piston member to the distance between adjacent cuts. This distance between cuts is preferably of substantially less than half the wavelength of possible flexural waves in the piston member at the operating frequency so as to prevent the build up of a substantial wave of interfering amplitude.

The length and width of the transducers are likewise preferably limited to substantially less than the half wavelength of the flexural waves in the transducer assembly at the maximum operating frequency. This likewise prevents the build up of the substantial interfering wave in the transducers.

The width of the orifice plate is preferably substantially less than half the wavelength of flexural waves in the plate at the maximum operating frequency so that possible flexural waves in the orifice plate are absent by nature of the elastic wave guide cutoff. An alternative to this, in the case of high frequency stimulation when an impractically narrow plate is required, is to use a wider plate with good vibration damping along the entire boundary of the plate.

With such a rigid orifice plate, the distance from the lower face of the piston to the top surface of the orifice plate becomes less critical for wideband (operating frequency range) stimulation, and is determined by fluid dynamic considerations. For narrowband stimulation it is advantageous to make this distance equal to an odd number of quarter wavelengths of fluid waves at the operating frequency so that the orifice plate is substantially at a nodal plane with zero vibration amplitude.

DETAILED DESCRIPTION OF THE PREFERRED EMBODIMENT

Figure 1:
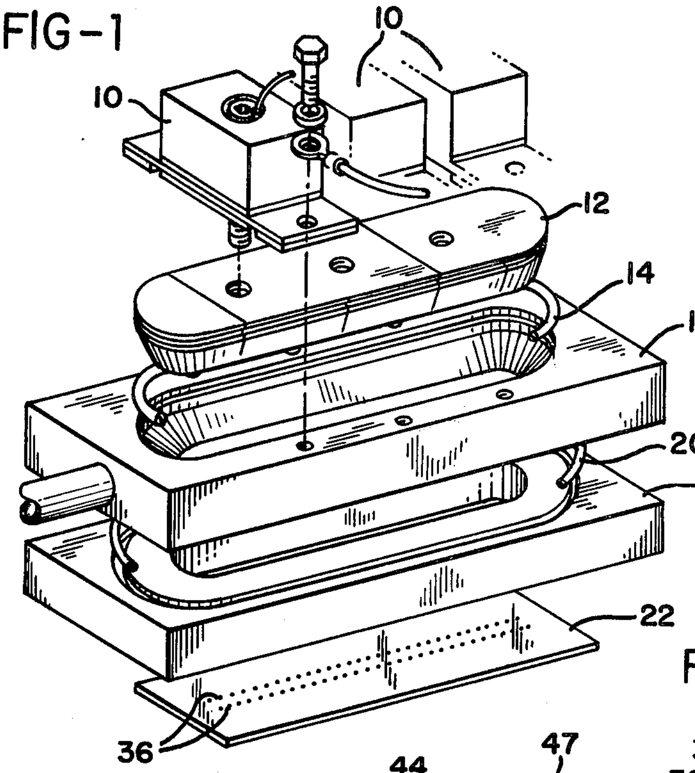
FIG. 1 is an expanded pictorial view of the preferred embodiment of a printing head assembly for an ink jet printing device, made in accordance with the present invention.

The basic components of the printing head assembly illustrated in FIG. 1 include a plurality of transducer assemblies 10, a piston member 12, a resilient O-ring 14, a transducer holder 16, a manifold block 18 with an intervening sealing O-ring 20, and an orifice plate 22. The present invention is only concerned with the printing head assembly including the above referred to major components and therefore details of the remainder of the printing apparatus are not discussed herein. For a description thereof reference may be made to Mathis U.S. Pat. No. 3,701,998.

Figure 2:
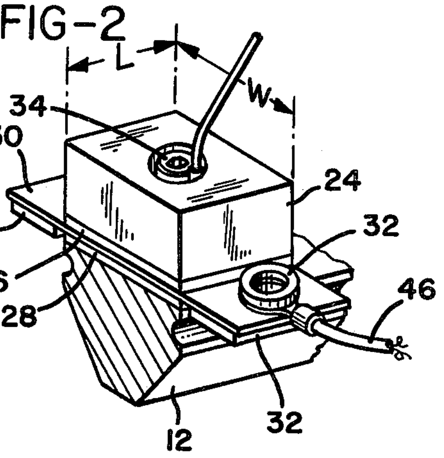
FIG. 2 is a pictorial view of a transducer assembly and a portion of a piston member of the embodiment of FIG. 1.
Figure 3:
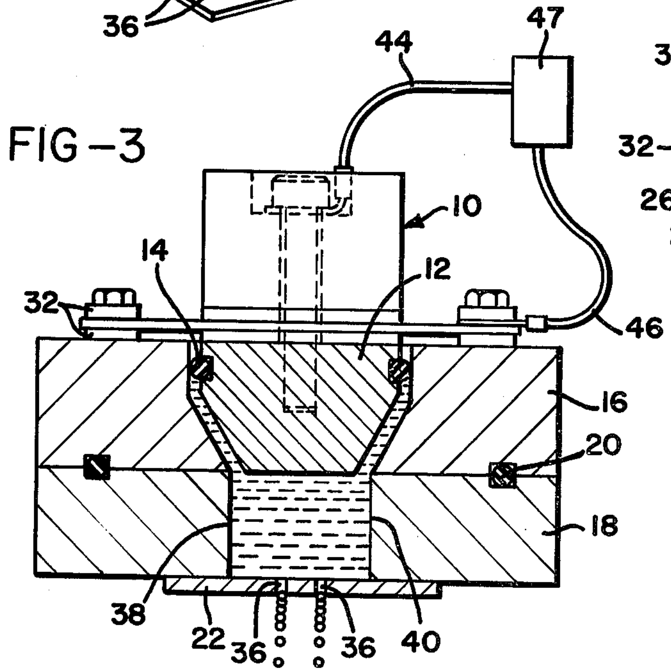
FIG. 3 is a cross sectional view of the assembled printing head of the embodiment of FIG. 1.

Each transducer assembly 10 is composed of an upper backing plate 24, a pair of piezoelectric transducers 26 and 28 which, are preferably thickness mode ceramic transducers, a transducer assembly mounting or attaching plate 30 which also functions as an electrode for transducers 26 and 28 sandwiched between resilient mounting members 32 which also act as electric insulators. The transducer assembly 10 is secured together by mounting the assembly on the piston member 12 with bolt 34 which extends through the transducer assembly into the piston member. The transducers 26 and 28 and upper backing member 24 are substantially coextensive and in parallel vertical alignment as illustrated in FIG. 2, with the width W being substantially co-extensive with the width of the piston member 12.

The width W and length L measured longitudinally of the piston member 12, are both preferably substantially less than one-half of the wavelength of flexural waves in the transducer assembly at the maximum operating frequency, as previously mentioned, in order to minimize the interference due to standing waves of significant amplitude which would effect the main wave propogation through the piston member. The term "flexural waves" as used herein means those waves which tend to cause flexure of the member being referred to in a direction transverse to the longitudinal direction along the length of the transducer array.

It is to be noted that although one-half the wave length is intended to be a substantial guide line for the dimensioning of the transducer assembly as well as other distances to be referred to below, it is not an absolute limit on these dimensions, but merely provides a guide line for establishing a reduced interference from reflected waves. These dimensions have a substantial effect on the efficiency of the equipment and quality of filament and drop generation, however, from a practical point of view this guide line is satisfactory.

Transducers 26 and 28 are relatively positioned so that their polarity is opposing. In other words, the positive terminal surfaces, for example, are disposed on opposite faces of the attaching plate 30 while the negative surfaces are respectively engaged with the upper backing plate 24 and the upper surface of piston member 12. This arrangement provides the added safety feature of preventing shock to an individual who might touch the transducers during operation since the transducers can be grounded.

The resilient mounting members 32 can be of any desired material and need only be of minimal thickness, so long as some resiliency is provided which is sufficient to substantially prevent transfer of vibration from the attaching plate 30 to the upper manifold 16 and also act as a good insulator. This is to prevent waves from traveling through the manifold and affecting drop propagation in the orifices.

The plurality of upper backing plates 24 should preferably be of generally higher acoustical impedance material than the piston member in order to enhance force transmission to the liquid.

The piston member 12 has a generally rectangular upper portion with semicylindrical ends, although this exact configuration is not essential and the upper surface could, for example, be entirely rectangular if desired. The lower portion of piston member 12 has a right trapezoidal cross-section with the semicylindrical end portions curving inward to form a truncated cone configuration as best seen in FIG. 1. It serves as an energy concentrator to focus the stimulation wave onto the orifices in the plate 22. Piston member 12 is preferably made of relatively low acoustic impedance material relatively close to the fluid impedance so that minimum reflection is encountered at the interface therebetween. Lower portions of piston member 12 can of course take other configurations, for example, the entire cross-section of the piston member may be rectangular.

The piston member 12 is resiliently surrounded by a resilient O-ring 14 which permits vertical movement of the piston member 12 due to excitation of transducers 26 and 28 in a manner to be described below. O-ring 14 provides a seal between the outer peripheral side portions of piston member 12 and the adjacent side portions of the walls of transducer holder 16 so as to prevent leakage of fluid from the manifold. O-ring 14 also acts to prevent transfer of interfering waves from the piston member into the transducer holder 16 in much the same way that the resilient mounting members 32 prevent transfer of interfering waves from the attaching plate 30.

Transducer holder 16 and manifold block 18 are likewise secured together by any desired means such as bolting or adhesion, and the fluid sealing O-ring 20 prevents leakage of the printing liquid from the reservoir between the surfaces of the transducer holder and the manifold block.

In the case of wide-band stimulation the distance from the bottom surface of the piston member to the upper surface of the orifice plate is not critical from stimulation point of view and can be as small as fluid dynamics allows. For narrow-band stimulation it should be a multiple of an odd quarter wavelength of the fluid compressional waves at the operating frequency. This substantially insures that the orifice plate is at the nodal plane where the vibration amplitude substantially vanishes.

Orifice plate 22 is of relatively rigid construction in that unlike the traveling wave stimulated orifice plates in which the orifice plate itself is vibrated, the present orifice plate is intended to remain rigid. Orifice plate 22 is secured by adhesion, soldering, or bolting with a supporting frame (not shown), against the lower surface of manifold block 18 so as to maintain the orifice plate 22 substantially rigid with orifices 36 aligned along the length of the orifice plate symmetrically below the lower portion of piston member 12. In order to assist in maintaining the orifice plate 22 rigid in the area of the reservoir, the inside walls 38 and 40 of manifold block 18 where they intersect the upper surface of orifice plate 22 are preferably separated by less than one-half the wavelength of flexural waves in the orifice plate at the maximum operating frequency, again to minimize the propagation of interfering waves within the orifice plate.

Figure 4:
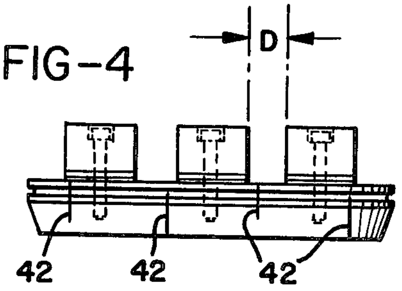
FIG. 4 is a side view of the piston member and transducer assemblies mounted thereon.

Referring to FIG. 4, the spacing between adjacent transducer assemblies D should also be less than one-half the flexural wavelength of the piston member 12 at the maximum operating frequency in order to reduce propagation of interfering waves.

Also, piston member 12 has a plurality of transverse slits 42 which extend entirely across the piston member 12 in vertical planes through the piston member. Adjacent slits are cut from opposite upper and lower surfaces through the piston member 12 for more than one-half of the height of the piston member so that there are no horizontal planes through the piston member which are not cut by at least some of the plurality of slits 42.

These slits provide substantial assistance in minimizing lateral wave propagation in the piston member which otherwise interferes with the energy uniformity along the piston and hence along the jet array. Slits 42 should be as thin as possible and should not extend so far past the midportion of the height of the piston member as to effect the rigidity of the piston member, since the piston member is intended to act substantially as a rigid body.

All transducer assemblies 10 of the transducer array are connected by wires 44 and 46 to a common signal generating device 47 so that a plurality of transducers are excited at substantially the same frequency.

In operation, the transducers are all excited at the desired frequency to produce a uniform series of drops from the plurality of orifices 36. Each transducer assembly is excited by the electric impulses supplied to both piezoelectric crystals 26 and 28. The crystals 26 and 28 apply equal forces against attaching member 30 which causes backing member 24 and piston member 12 to be displaced in opposite directions. Therefore, the plate 30 is substantially positioned at a nodal point between the two transducers where minimal excitation of the attaching plate will occur. This further substantially reduces the transfer of interfering wave motion from the attaching plate to the transducer holder 16. As piston member 12 is forced up and down by the combined action of transducers 26 and 28 it acts upon the printing liquid to form plane waves parallel to the orifice plate and propogate through the liquid towards the orifice plate. Corresponding disturbance is introduced into the issuing jets from the orifices 26 and the growth of the disturbance, following Rayleigh's criteria, breaks the jets into uniform droplets.

It is important to simultaneously and with equal amplitude excite all of the transducers along the length of the piston member 12. To achieve this, the preferred method of transducer array excitation is to operate off resonance even though on resonance excitation is more efficient and achievable. The reason for this is that in practice the resonance frequency of transducers is likely to be slightly different due to variation of various physical parameters of a composite transducer. However, both the transducer amplitude and phase depend on frequency. When transducers having similar but not exactly the same resonant frequency are simultaneously driven at a given frequency, for example the resonant frequency of one of the transducers, the other transducers will be supplying different amplitudes at different times to the piston member 12 than the transducer driven at resonance.

The magnitude of the differences depends on the width of the resonance band; the narrower the band the larger the difference in magnitude. However, amplitude and phase become relatively independent of frequency when a transducer is operated off resonance, hence a much more uniform amplitude and phase distribution across the upper surface of the piston member 12 can be obtained by driving the transducers at a level above or below their resonant frequencies. At these frequencies there is greater uniformity in the amplitude and phase supplied and although the vibrational amplitudes are substantially reduced due to driving the transducers off their resonant frequency, this can be compensated for by applying a higher voltage. However, the advantage obtained in uniform synchronous application of force is well worth such an increased consumption.

Although the foregoing illustrates the preferred embodiment of the present invention, other variations are possible. All such variations as would be obvious to one skilled in this art are intended to be included within the scope of the invention as defined by the following claims.

What is claimed is:

1. Apparatus for producing a plurality of streams of fluid droplets, comprising:

elongated reservoir means for containing a liquid under pressure;

orifice plate means forming a bottom portion of said reservoir means and having a plurality of orifices arranged in an elongated pattern therein through which said liquid can be expelled from said reservoir means in a series of continuously flowing streams;

elongated piston means disposed above said reservoir means in vibrational isolation therefrom and having a bottom surface in contact with said liquid;

a plurality of separated but closely spaced electroacoustical transducer means engaging a top surface of said piston means opposite said bottom surface in end-to-end arrangement and disposed outside of said reservoir means, for causing vertical translational movement of said piston means so as to generate a continuous series of plane waves and induce a substantially uniform pressure disturbance in said fluid issuing from said orifices;

support means for resiliently supporting said plurality of transducer means and said piston means on said reservoir means; and means for simultaneously repetitively activating said stimulator means to cause a series of said disturbances.

2. Apparatus as defined in claim 1 wherein said piston means is an elongated member supported by piston support means comprising a fluid sealing resilient gasket member disposed continuously around the peripheral edge portion of said piston means and sealingly engaging between said reservoir means and said piston means.

3. Apparatus as defined in claim 2 wherein each said transducer means includes at least one piezoelectric transducer means having a length longitudinally of said piston means of less than about one-half of the flexural wavelength of said transducer means at the maximum frequency of operation thereof.

4. Apparatus as defined in claim 3 wherein each said piezoelectric transducer means comprises:

upper and lower coextensive piezoelectric members, said upper member superposed above said lower member;

an attaching plate sandwiched between said upper and lower members and secured on opposite sides of said members to said reservoir means;

a backing member supported by said upper member;

means securing said backing member, said upper and lower members and said attaching plate together and secured to the upper surface of said piston means with said lower member in engagement with said upper surface.

5. Apparatus as defined in claim 4 wherein said piston means has a plurality of transverse vertical slits defined therein with adjacent slits extending alternately from upper and lower surfaces at least halfway through the thickness of said piston means so that there is no horizontal plane in said piston means which is not cut by at least some of said slits adjacent said slits being spaced less than about one-half the flexural wavelength of said piston means at the maximum frequency of operation thereof.

6. Apparatus as defined in claim 5 wherein said piston means has an upper portion of generally rectangular cross-section and a lower portion with a transverse cross-section of generally right trapezoidal configuration with side portions tapering inwardly towards said orifice plate means.

7. Apparatus as defined in claim 6 wherein a plurality of said transducer means are disposed along said top surface of said piston means, each being symmetrical about a vertical longitudinal plane through said piston means and spaced less than about one-half the flexural wavelength at the maximum operating frequency thereof of said piston means.

8. Apparatus as defined in claim 7 wherein the distance from the bottom of said piston means to the upper surface of said orifice plate is substantially a multiple of an odd quarter of the liquid vibrational wavelength at the operating frequency of said apparatus.

9. Apparatus as defined in claim 8 wherein the internal side walls of said reservoir means adjacent said orifice plate means are spaced less than about one-half the wavelength of the flexural waves in said orifice plate means at the maximum operating frequency of said apparatus.

10. An ink jet printing head for use in ink jet recording devices and the like, comprising:

a manifold defining a liquid reservoir for providing a continuous supply of printing liquid under pressure;

a rigid orifice plate secured to a lower surface of said manifold and forming a bottom of said reservoir, said orifice plate having a plurality of orifices defined therein through which said liquid can be expelled from said reservoir, the internal side walls of said manifold forming said reservoir adjacent said orifice plate being spaced less than about one-half the wavelength of the flexural waves in said orifice plate at the operating frequency of said printing head;

a piston member disposed above said reservoir and having a bottom surface in contact with said liquid, said piston member being elongated and having an upper portion with a generally rectangular cross section and a lower portion with a generally right trapezoidal transverse cross section with the side walls thereof tapering inwardly towards said orifice plate towards a bottom surface thereof disposed parallel to said orifice plate, a plurality of transverse slits being defined in said piston member with adjacent slits extending from opposite upper and lower surfaces thereof at least halfway through the height of said piston member;

a plurality of transducer assemblies secured to the upper surface of the piston member with adjacent transducers being spaced less than about one-half the flexural wavelength of the piston member at the maximum frequency of operation thereof and each transducer assembly engages the upper surface of the piston member across substantially the entire width thereof and has a dimension longitudinally of said piston member of less than about one-half the flexural wavelength of the transducer assembly at the maximum frequency of operation thereof;

means for resiliently supporting said plurality of transducer assemblies and said piston member on said manifold so as to substantially vibrationally isolate said transducer assemblies and said piston from said manifold; and means for simultaneously repetitively activating said transducer assemblies so as to cause vertical translational movement of said piston member.

* * * * *